United States Patent [19]

Saito et al.

[11] Patent Number: 4,729,629

[45] Date of Patent: Mar. 8, 1988

[54] BONDED SHEATH CABLE WITH LUBRICANT OVER SEAM

[75] Inventors: Yasunori Saito; Kenji Morita, both of Cary; Yves P. P. Simons; Fred T. McDuffee, both of Raleigh, all of N.C.

[73] Assignee: Sumitomo Electric Research Triangle, Inc., Research Triangle Park, N.C.

[21] Appl. No.: 19,071

[22] Filed: Feb. 26, 1987

[51] Int. Cl.$^4$ ............................................. G02B 6/44
[52] U.S. Cl. ................................. 350/96.23; 174/107
[58] Field of Search ...................... 350/96.23; 174/107, 174/108, 109

[56] References Cited

U.S. PATENT DOCUMENTS

| | | | |
|---|---|---|---|
| 3,137,120 | 6/1964 | Budenbender | 57/162 |
| 3,651,244 | 3/1972 | Silver et al. | 174/107 X |
| 3,943,271 | 3/1976 | Bahder et al. | 174/23 R |
| 4,075,419 | 2/1978 | Virkus | 174/107 |
| 4,221,926 | 9/1980 | Schneider | 174/107 |
| 4,272,155 | 6/1981 | Slaughter | 350/96.23 |
| 4,333,706 | 6/1982 | Davis et al. | 350/96.23 |
| 4,439,632 | 3/1984 | Aloisio, Jr. et al. | 174/107 X |
| 4,441,686 | 4/1984 | Seyffer | 251/127 |
| 4,508,423 | 4/1985 | Winter et al. | 350/96.23 |
| 4,541,686 | 9/1985 | Barfuss et al. | 350/96.23 |
| 4,563,540 | 1/1986 | Bohannon, Jr. et al. | 174/107 X |

FOREIGN PATENT DOCUMENTS

| | | | |
|---|---|---|---|
| 2817045 | 11/1978 | Fed. Rep. of Germany | 350/96.23 |
| 80/01517 | 7/1980 | World Int. Prop. O. | 350/96.23 |
| 2141558 | 12/1984 | United Kingdom | 350/96.23 |

Primary Examiner—William L. Sikes
Assistant Examiner—Frank González
Attorney, Agent, or Firm—Richard E. Jenkins

[57] ABSTRACT

A bonded sheath cable is disclosed of the type having a metallic shield wrapped around a cable core so as to form a longitudinal seam. A jelly-like lubricant overlays the metallic shield seam area and serves to decouple the bond between the metallic shield and an outer plastic jacket. The lubricant allows for relative movement between the longitudinal ends of the metallic shield and the overlying jacket layer without damaging the jacket layer if the bond between the overlapping ends of the metallic shield is broken and the cable twisted during installation or in some other manner.

23 Claims, 4 Drawing Figures

BONDED SHEATH CABLE WITH LUBRICANT OVER SEAM

DESCRIPTION

1. Technical Field

This invention relates to a bonded sheath cable, and more particularly to a cable having a metallic sheath wrapped around a cable core so as to form a longitudinal seam and wherein the metallic shield is bonded to a plastic outer jacket.

2. Background Art

For a number of years it has been known to provide a sheath system including layers of metal and plastic around the cable core in order to properly protect communication cables which are to be utilized in outside and buried applications. Various constructions of metallic sheaths bonded to a plastic jacket have been utilized in both conventional electrical communications cables of the type incorporating copper electrical conductors as well as the more modern optical fiber communications cables utilizing light transmitting waveguides or optical fibers. However, it has been determined that shortcomings are presented in all of the cable constructions known to this time.

Quite a number of efforts have been made to provide suitable bonded sheath cable constructions. For example, U.S. Pat. No. 3,137,120 discloses the use of a thermoplastic resin tape over the overlapping edge of the metal sheath and securing it in place with two helically wound binding strands. A film of oil is applied to the underside of the tape to assure that all portions adhere to the metallic sheath. U.S. Pat. No. 3,943,271 teaches the use of a bridging tape along the metallic shield overlap seam in combination with a filling compound applied over and under the metallic shield. The bridging tape serves to prevent the outer edge of the lap seam from cutting into the outer jacket and freely moves when the copper cable expands, and the flooding compound serves to prevent moisture intrusion. U.S. Pat. No. 4,075,419 teaches a seam cable wherein an elastomeric and resilient element is provided as a bridge over the metal shield overlap in order to solve the problem of expansion of high voltage conventional power cables due to an increase in temperature which can cause the metal shield overlap to cut into the plastic outside jacket. Excessive stretching of the outer plastic jacket is eliminated by decoupling the plastic jacket from the metal tape overlap using a resilient bridging element. Also of interest, U.S. Pat. No. 4,221,926 discloses a waterproof shielded cable construction process which includes applying a heat-shrinkable tape over the metallic shield overlap seam either with or without a water blocking material present in the interstices therebetween in order to prevent ripping of the cable at the overlap seam due to severe bending incurred during cable installation.

Still other patents of interest include U.S. Pat. Nos. 4,563,540; 3,651,244; 4,272,155; 4,333,706; and 4,439,632.

As can be fully appreciated with a careful study of these patents, it has been recognized by those familiar with bonded sheath cable construction that the overlap seam of the metallic shield or tape is a potential source of damage to the cable. In order to alleviate this problem, tapes have been applied over the same and secured in place in a number of ways. In conventional electrical conductor cable construction, the tape must typically allow for expansion of the cable whereas in optical fiber cable construction this is not a significant concern. All of the cable constructions and manufacturing processes heretofore known to applicant result in inherent shortcomings due either to manufacturing complexities which can slow down production speeds or to their inability to fully overcome the problems associated with the tendency of the metallic sheath overlap seam to cut or tear the protective outer jacket of the bonded sheath cable.

DISCLOSURE OF THE INVENTION

In accordance with the present invention, applicant provides an improved bonded sheath cable construction which overcomes the aforementioned problems relating to the tendency of the metallic sheath overlap seam to detrimentally affect the cable jacket. The bonded sheath cable comprises a cable either of the conventional electrical conductor type or of the newer optical fiber type. A layer of plastic surrounds and encloses the cable, and a metallic sheath is wrapped around the plastic layer so as to form a longitudinally extending overlapped seam having overlying and underlying edge portions which are bonded together in a suitable fashion including use of an applied adhesive or heat sealing of the overlapped edge portions together if the metallic shield has been provided with a suitable copolymer coating for corrosion protection and the like. A layer of jelly-like lubricating material is applied along the length of the longitudinal seam in order to prevent bonding of the overlapped metallic shield seam with the plastic jacket which is applied to and surrounds the metallic shield. It should be emphasized that the plastic jacket is fully bonded to the metallic shield except where it overlies the jelly-like lubricant which has been applied to the overlap seam area. In this fashion, the outside plastic jacket of the bonded sheath cable has been decoupled from the metallic shield overlap seam and this has been found to eliminate splitting of the plastic jacket adjacent the overlap if the bond between the overlapping edge portions is broken when twisting forces are applied to the cable. Therefore, an improved bonded sheath cable is provided which is better adapted to resist twisting and bending forces and lends itself to increased manufacturing speed due to the simplicity of its construction. The enhanced twisting strength of the cable is particularly advantageous since during underground installation a bonded sheath cable is subjected simultaneously to torsion, bending and twisting forces as it is pulled from an underground pathway and coiled into a "FIG. 8" configuration on the ground prior to being forced through another segment of the underground pathway.

Accordingly, it is a general object of the present invention to provide an improved cable construction of the type having a plastic jacket extruded over a metallic shield forming a longitudinally extending seam along the length of the cable.

More specifically, it is an object of the present invention to provide a bonded sheath cable incorporating a metallic shield with overlapping ends forming a longitudinal seam wherein the plastic jacket layer overlaying the metallic shield is decoupled therefrom at the overlapping seam area in order to provide enhanced resistance to twisting forces.

Another object of the present invention is to provide a bonded sheath optical fiber cable of the type having a metallic shield wherein the overlapping edge portions thereof form a longitudinally extending seam and which is decoupled from the overlying plastic jacket by the provision of a jelly-like lubricant therebetween in order to eliminate jacket splitting due to twisting forces.

Still another object of the present invention is to provide a bonded sheath cable of either the conventional electrical conductor or optical fiber type which is of a relatively simple improved construction so as to facilitate enhanced manufacturing speed and the attendant manufacturing economies associated therewith.

DESCRIPTION OF THE DRAWINGS

Some of the objects of the invention having been stated, other objects will become evident as the description proceeds, when taken in connection with the accompanying drawings, in which.

BEST MODE FOR CARRYING OUT THE INVENTION

Figure 1:
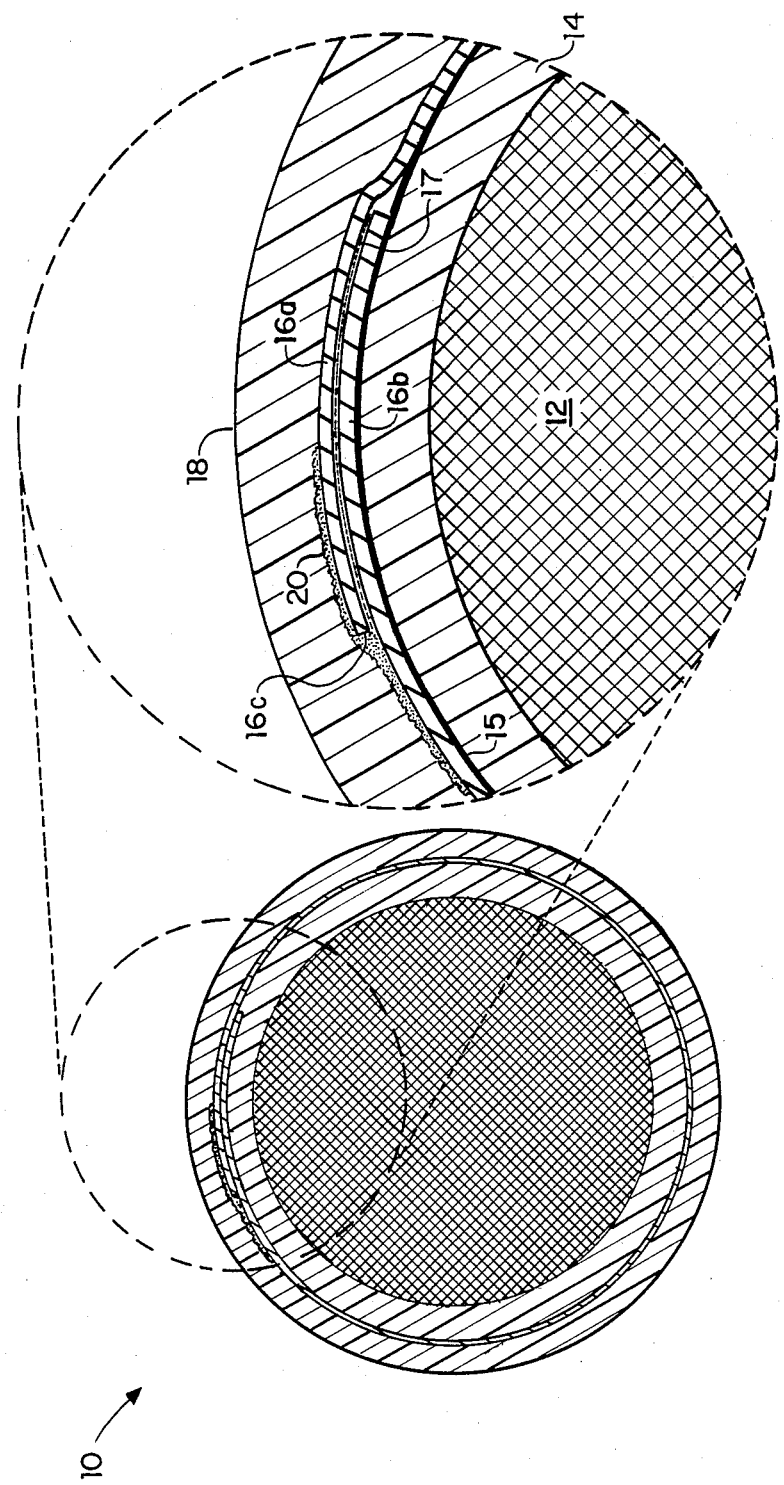
FIG. 1 is a transverse cross-sectional view of a bonded sheath cable made in accordance with the present invention with the seam area enlarged for clarity of illustration.
Figure 2:
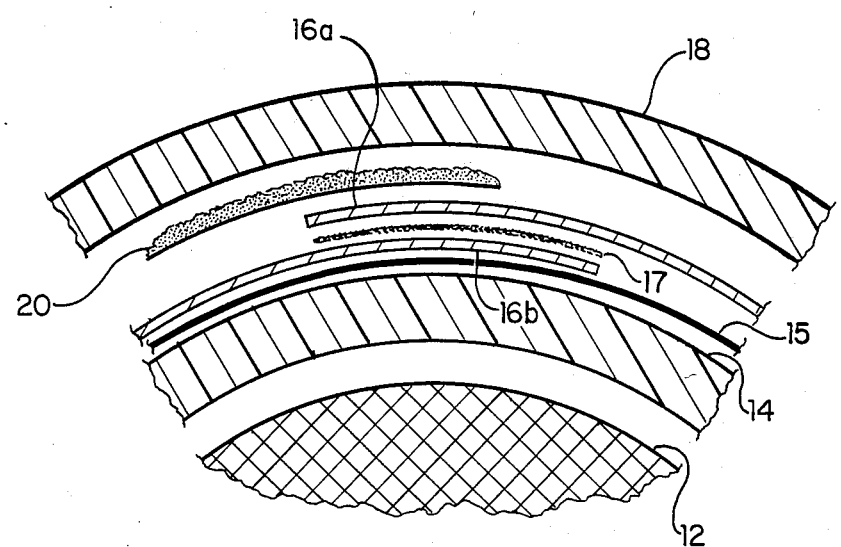
FIG. 2 is diagrammatic, exploded view showing a jelly-like lubricant extending across a metallic shield lap seam and positioned between the metallic shield and the plastic jacket layer of the bonded sheath cable.
Figure 3:
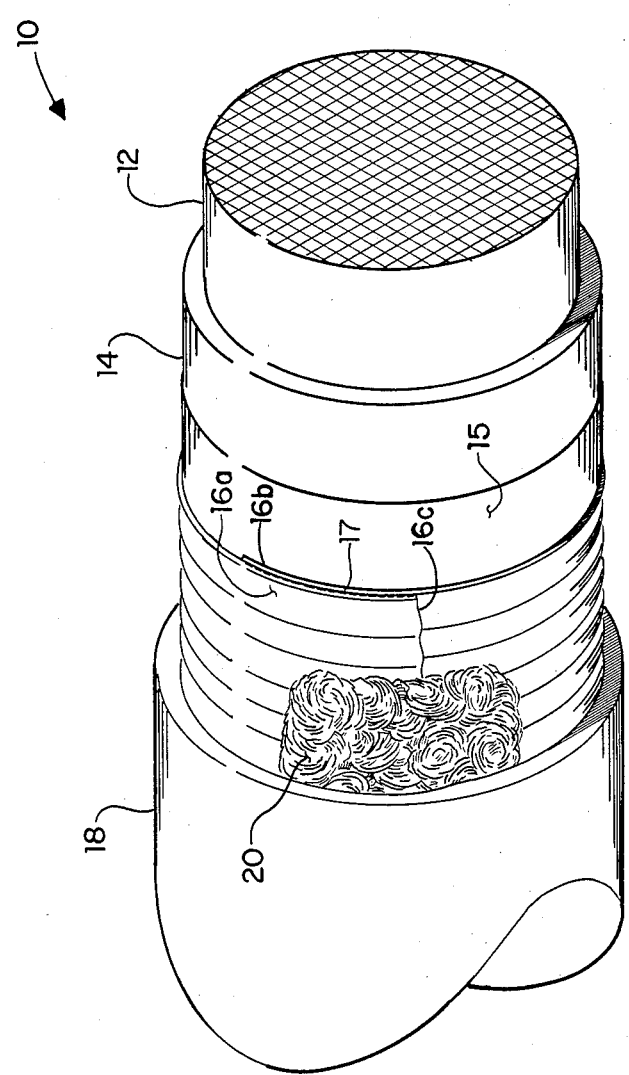
FIG. 3 is perspective view of a bonded sheath cable made in accordance with the present invention, with different parts broken away along the length of the cable for clarity of illustration.

Referring now in more detail to FIGS. 1-3 of the drawings, a bonded sheath cable according to the present invention is shown therein and generally designated 10. Cable 10 comprises a cable core 12 which may consist of any conventional electrical or optical fiber communications cable having one or more electrical conductors or light transmitting waveguides, respectively. For the purposes of this description, it will be assumed that cable core 12 comprises an optical fiber communications cable of the type having a central strength member and a plurality of buffer tubes positioned therearound wherein each tube contains a plurality of optical fiber light transmitting waveguides. Immediately surrounding cable core 12 is a layer of plastic material 14, such as polyethylene, which is normally extruded onto cable core 12 during the manufacturing process. Also shown in the drawings (FIGS. 1-3) is an optional layer of water blocking material 15 applied over plastic layer 14 which can be provided at the request of a cable customer to serve as a water block or barrier. Water blocking material 15 may be a petroleum or silicone based jelly, a non-woven longitudinal tape and binder therefore or other suitable water barrier as may be appropriate. Metallic shield 16, which is most suitable a corrugated steel tape, is wrapped around plastic layer 14 and flooding material 15 so that the longitudinal edges thereof overlap so as to have overlying and underlying edge portions 16a, 16b, respectively, which form a longitudinally extending seam 16c (see FIG. 3) along the length of the cable. Metallic shield 16 serves as an armored steel jacket in order to protect cable 10 from compressive and impact forces as well as from such exogenous factors as gopher attacks when it is used in outdoor applications.

The amount of overlap provided by edge portions 16a, 16b of metallic shield 16 may be of a width between about 5-15 millimeters in most cable constructions. Metallic shield or steel tape 16 may be of substantially any suitable thickness and may be coated, as a matter of choice, on one or both sides with a thin layer of a copolymer material (such as ethylene acrylic acid) to assist in preventing corrosion. If steel tape 16 is coated and the coating is provided on only one side, the copolymer material should be provided on the top surface of steel tape 16 to facilitate bonding with a jacket layer of plastic material 18 (most suitably polyethylene) which is applied over steel tape 16 during manufacture.

The edge portions 16a, 16b of steel tape 16 are bonded together in any conventionally suitable manner. For example, if steel tape 16 is provided with a copolymer coating on both sides thereof, overlying edge portion 16a can be secured to underlying edge portion 16b by heat sealing the overlap together. Alternatively, the overlapping edge portions can be secured together merely by applying a glue material 17 (see FIG. 2) between overlying edge portion 16a and underlying edge portion 16b. These bonding procedures are very process dependant and can be difficult to control. A good bond of the overlying edge portions has been very important up to the present, however, since if there was not a strong bond provided between edge portions 16a, 16b of steel tape 16 and there was a strong bond between steel tape 16 and plastic jacket layer 18, plastic jacket layer 18 could crack under twisting and/or bending forces due to a "notching" effect caused by the outermost edge of overlying edge portion 16a of steel tape 16.

In order to eliminate the "notching" effect of steel tape 16 on plastic jacket layer 18 during twisting of cable 10 (which is particularly detrimental if the bond is broken between edge portions 16a, 16b of steel tape 16), applicant provides a jelly-like lubricant material 20 over seam 16c of steel tape 16. Preferably, lubricant 20 extends no greater than 80 percent of the width of the overlap of overlying and underlying edge portions 16a, 16b, respectively, in each direction from seam 16c. Lubricant material 20 is most suitably a petroleum based or silicone based jelly, although other lubricants may be used so long as the lubricant is compatible with plastic jacket layer 18. As can now be appreciated, applicant has essentially decoupled the overlapping seam area of steel tape 16 from overlying plastic jacket layer 18 while elsewhere maintaining a strong bond therebetween so as to aid in installation of the cable.

Lubricant material 20 most suitably is applied during the manufacturing process after steel tape 16 has been wrapped around plastic layer 14 and either prior to or simultaneously with the extrusion of plastic jacket layer 18 over steel tape 16. Lubricant material 20 is applied over seam 16c (or the longitudinal edge of edge portion 16a) and somewhat laterally to each side thereof to a width which should not exceed about ⅓ the total circumference of steel tape 16. Since applicant's cable requires less emphasis on achieving a perfect bond between edge portions 16a, 16b in the manufacturing process in order to prevent tearing of plastic jacket layer 18, manufacturing of the improved bonded sheath cable 10 is simplified and therefore manufacturing productivity is enhanced. Even if the bond between edge portions 16a, 16b should be broken, the edge of overlying portion 16a, will be able to move relative to plastic jacket 18 due to lubricant 20 thereover and will not tend to "notch" or tear jacket 18 during twisting of cable 10.

PERFORMANCE TEST

Figure 4:
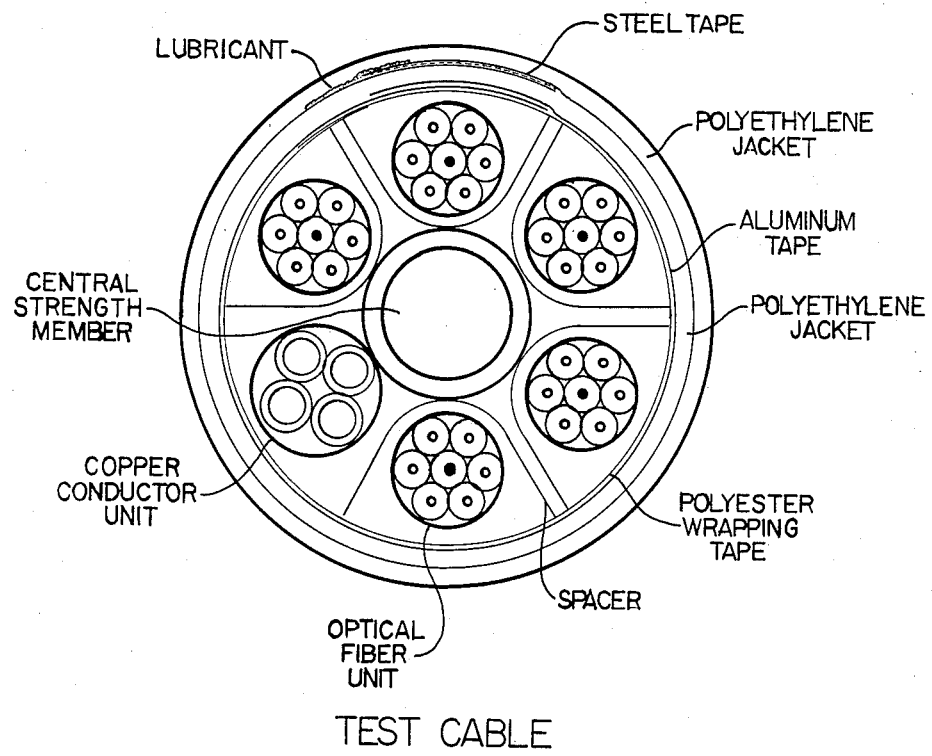
FIG. 4 is a transverse cross-sectional view of one type of bonded sheath cable made in accordance with the present invention and utilized to obtain the test results set forth herein.

The performance characteristics of a bonded sheath cable made in accordance with the invention (see FIG. 4) are set forth below in table form. The cable comprises an optical fiber cable core with a 30 fiber count contained in five stranded units each containing six tight buffered fibers stranded around a 0.97 millimeter steel wire and surrounding a 4.0 millimeter diameter central strength member of steel with polyethylene coating. Four copper conductors are also contained in a separate unit adjacent the central strength member. The six stranded units are separated by spacers and provided with a polyester wrapping tape therearound. Although not necessary to the invention, a 2.06 inch wide aluminum tape which is coated on both sides with ethylene acrylic acid is wrapped around the cable core and a first polyethylene jacket applied thereover. A 2.5 inch wide steel tape having both sides coated with ethylene acrylic acid and approximately 13 corrugations per inch is wrapped around the first polyethylene jacket and the overlap seam sealed with a hot melt adhesive, a petroleum based lubricant applied over the overlap seam area, and a second polyethylene jacket applied thereover. The first polyethylene jacket has a thickness of 1.45 millimeters and the second jacket has a thickness of 1.5 millimeters. The total diameter of the bonded sheath cable tested was 21.9 millimeters.

In order to fully appreciate the performance data set forth in the table below, it should be noted that if a lubricant material had not been applied to this particular cable construction, a sample 4 meters long and twisted ±180 degrees could be expected to suffer a jacket crack in as little as one cycle due to the bond between the overlapping edges breaking and the edge of the overlying portion of the steel tape cutting into the outer polyethylene jacket. The results of the test cable constructed according to the invention are set forth as follows:

| Sample Length | TEST RESULTS Rotation Angle | Number of Cycles |
|---|---|---|
| 2 m | ±360° | 20 No Damage |
| 2 m | ±720° | 20 No Damage |
| 2 m | +3240° | 1 Break in Grips |

The results dramatically show that the new bonded sheath cable construction can be subjected to significantly greater twisting forces than previous constructions without suffering damage to the outer polyethylene jacket.

It will thus be seen that there has been described above an improved bonded sheath cable construction which substantially eliminates splitting of the plastic jacket due to significant twisting forces encountered during installation. Moreover, bending properties are improved and the steel tape overlap is substantially sealed by the lubricant so as to resist water penetration. The decoupling of the overlapping portion of the steel tape from the overlying polyethylene jacket due to the jelly-like lubricant therebetween allows for greater ease of processing since less emphasis must now be placed on achieving a substantially perfect bond between the overlapping portions of the steel tape.

It will be understood that various details of the invention may be changed without departing from the scope of the invention. Furthermore, the foregoing description is for the purpose of illustration only, and not for the purpose of limitation—the invention being defined by the claims.

What is claimed is:

1. A bonded sheath cable comprising:
    a cable which includes at least one conductor;
    a layer of plastic material which encloses said cable;
    a metallic shield which is wrapped around said layer of plastic material to form a longitudinal overlapped seam having overlying and underlying edge portions formed by overlapping adjacent longitudinal edges of said shield, said edge portions being bonded together;
    a layer of viscous lubricating material which is applied along the length of said longitudinal overlapped seam; and
    a jacket layer of plastic material which is bonded to substantially all of the outer surface of said shield except for the overlapped seam area to which said lubricating material has been applied;
    whereby said jacket layer is decoupled from said overlapped seam area of said shield in order to allow such relative movement therebetween as may be necessary to resist tearing of said jacket layer when the cable is subjected to twisting forces.

2. A bonded sheath cable according to claim 1 wherein said cable is an optical fiber communications cable comprising at least one light transmitting waveguide.

3. A bonded sheath cable according to claim 1 wherein said cable is a conventional electrical communications cable comprising at least one electrical conductor.

4. A bonded sheath cable according to claim 1 wherein said layer of plastic material and said jacket layer comprise polyethylene.

5. A bonded sheath cable according to claim 1 including a water blocking material applied between said layer of plastic material and said metallic shield.

6. A bonded sheath cable according to claim 1 wherein said metallic shield is a corrugated metallic tape having at least one surface coated with a copolymer material.

7. A bonded sheath cable according to claim 6 wherein both surfaces of said tape are coated with a copolymer material and said overlapped edge portions are bonded by heat sealing.

8. A bonded sheath cable according to claim 6 wherein said copolymer material is ethylene acrylic acid.

9. A bonded sheath cable according to claim 1 wherein said overlying and underlying edge portions of said shield are adhesively bonded together.

10. A bonded sheath cable according to claim 1 wherein said lubricating material comprises a jelly-like petroleum based material.

11. A bonded sheath cable according to claim 1 wherein said lubricating material comprises a jelly-like silicone based material.

12. A bonded sheath cable according to claim 1 wherein said overlying and underlying edge portions have a coextensive width of about 5–15 millimeters and the width of said lubricating material applied to said overlapped seam is not greater than ⅛ of the circumference of said shield.

13. A bonded sheath cable according to claim 1 wherein said lubricating material is applied along the longitudinal edge of said overlying edge portion and extends laterally therefrom in each direction no greater than 80 percent of the width of said overlapped seam formed by said overlying and underlying edge portions.

14. A bonded sheath cable comprising:
an optical fiber communications cable comprising a plurality of light transmitting waveguides;
a layer of plastic material which encloses said optical fiber cable;
a corrugated metallic tape which is wrapped around said layer of plastic material to form a longitudinal overlapped seam with overlying and underlying edge portions formed by overlapping adjacent longitudinal edges of said tape, said edge portions being bonded together;
a layer of jelly-like lubricating material which is applied along the length of said overlapped seam; and
a jacket layer of plastic material which is bonded to substantially all of the outer surface of said tape except for the overlapped seam area to which said lubricating material has been applied;
whereby said jacket layer is decoupled from said overlapped seam area of said tape in order to allow such relative movement therebetween as may be necessary to resist tearing of said jacket layer when the cable is subjected to twisting forces.

15. A bonded sheath cable according to claim 14 wherein said layer of plastic material and said jacket layer comprise polyethylene.

16. A bonded sheath cable according to claim 14 including a water blocking material applied between said layer of plastic material and said metallic tape.

17. A bonded sheath cable according to claim 14 wherein said tape is coated with a copolymer material and said overlapped edge portions are bonded by heat sealing.

18. A bonded sheath cable according to claim 17 wherein said copolymer material is ethylene acrylic acid.

19. A bonded sheath cable according to claim 14 wherein said overlying and underlying edge portions of said tape are adhesively bonded together.

20. A bonded sheath cable according to claim 14 wherein said lubricating material is petroleum based.

21. A bonded sheath cable according to claim 14 wherein said lubricating material is silicone based.

22. A bonded sheath cable according to claim 14 wherein said overlying and underlying edge portions have a coextensive width between about 5-15 millimeters and the width of said lubricating material applied to said overlapped seam is not greater than ⅛ of the circumferences of said tape.

23. A bonded sheath cable according to claim 14 wherein said lubricating material is applied along the longitudinal edge of said overlying edge portion and extends laterally therefrom in each direction no greater than 80 percent of width of said overlapped seam formed by said overlying and underlying edge portions.

* * * * *